Sept. 25, 1973　　　　O. K. C. MANG　　　　3,761,377
ATMOSPHERIC CHLORINE DETECTION APPARATUS
Filed April 4, 1972　　　　　　　　　　　　　　3 Sheets-Sheet 1

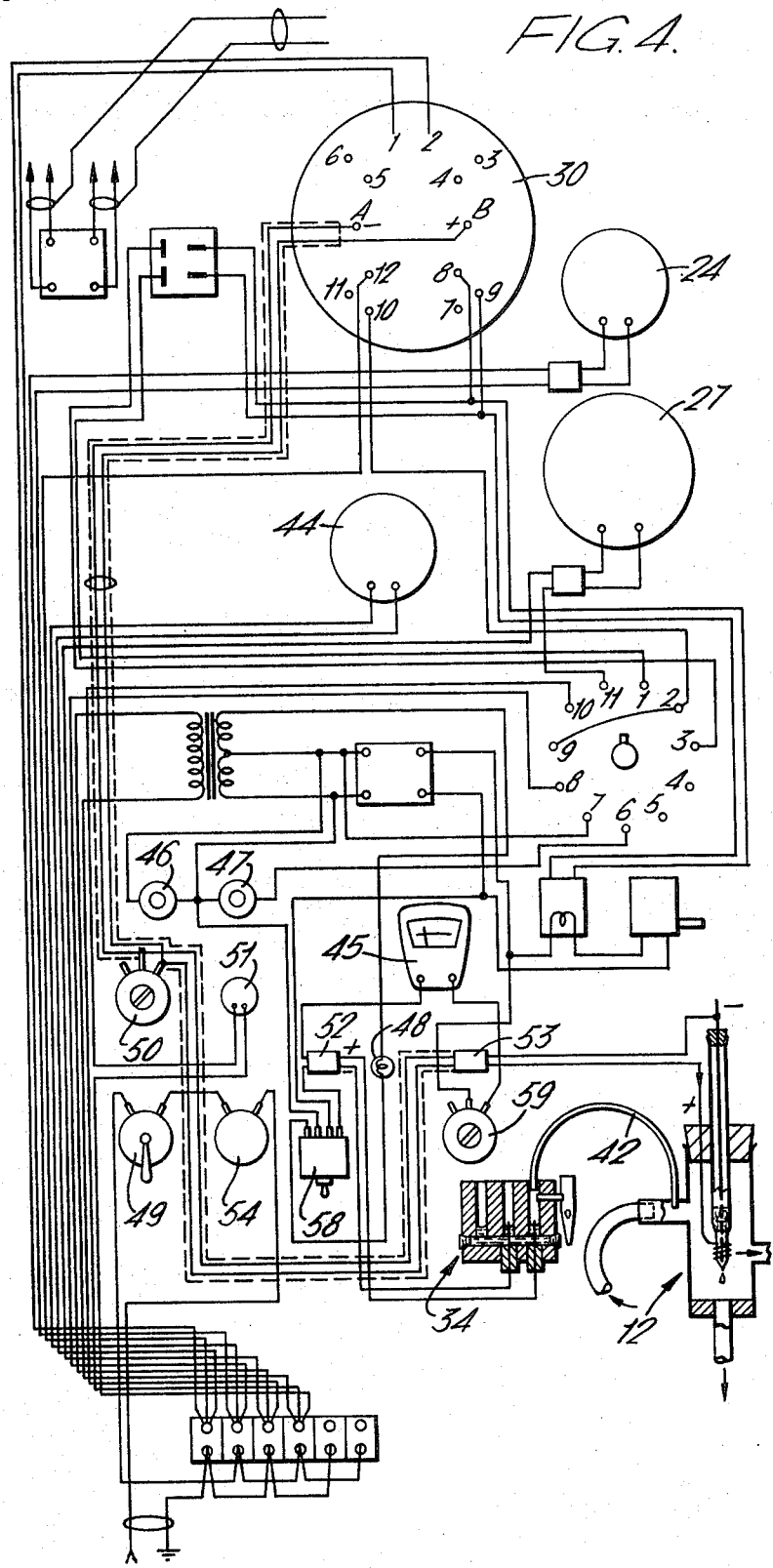

3,761,377
ATMOSPHERIC CHLORINE DETECTION APPARATUS
Oswald Karl Clarence Mang, Box 802,
Regina, Saskatchewan, Canada
Filed Apr. 4, 1972, Ser. No. 241,039
Claims priority, application Canada, Nov. 5, 1971,
126,987
Int. Cl. G01n 27/46
U.S. Cl. 204—195 R  10 Claims

ABSTRACT OF THE DISCLOSURE

An electronegative gas, such as chlorine, is detected in a gaseous mixture by passing an aqueous electrolyte across the surfaces of first and second spaced electrodes in the direction from the first electrode to the second electrode, the electrodes being externally connected by a current detection circuit, and passing the gaseous mixture across the second electrode, the electronegative gas component dissolving in the electrolyte with the formation of negative ions thereby to cause a current to flow through the current detection circuit.

---

This invention relates to a method and apparatus for the detection of electronegative gas components in gaseous mixtures, such as for example, the detection of chlorine in atmospheric air. By "electronegative gas" is meant a gas which dissolves in an aqueous solvent with the formation of negative ions.

According to the present invention, an electronegative gas component in a gaseous mixture is detected by passing an aqueous electrolyte across the surfaces of first and second electrodes in the direction from the first electrode to the second electrode, the electrodes being externally connected by a current detection circuit, and passing the gaseous mixture across the second electrode so that the electronegative gas component to be detected dissolves in the electrolyte with the formation of negative ions, the second electrode thus acquiring a positive potential with respect to the first electrode thus causing a current to flow in the detection circuit.

An apparatus for carrying out the method basically comprises: means defining a flow path for the gaseous mixture; first and second electrodes, said second electrode being located in said flow path and said first electrode being shielded therefrom; circuit means interconnecting the electrodes, said circuit means including current detection means; and means defining a flow path for aqueous electrolyte whereby the electrolyte is caused to flow across the surfaces of the electrodes in the direction from the first electrode to the second electrode, thereby to dissolve said electronegative component with the formation of negative ions and so to cause a current to flow through the current detection means.

In order that the invention may be readily understood one embodiment thereof will now be described by way of example with reference to the accompanying drawings, in which:

FIG. 4 is an electrical wiring diagram of the powered parts of the apparatus.

Figure 1:
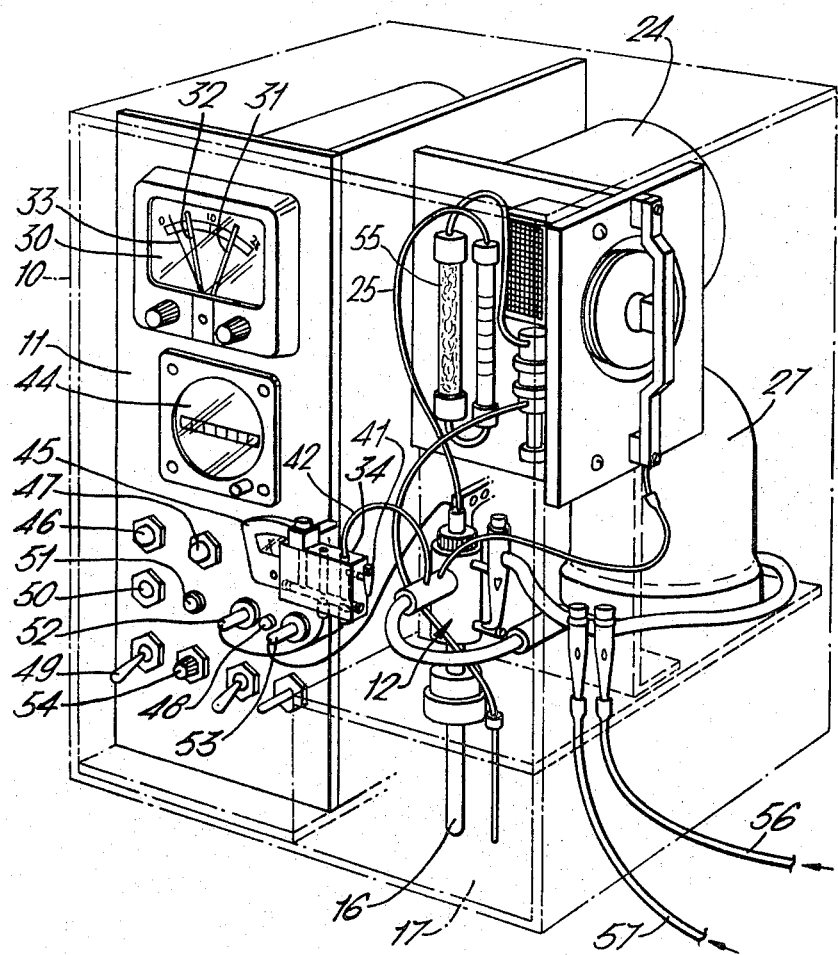
FIG. 1 is a general perspective view of an apparatus according to the invention for the detection of chlorine in atmospheric air.

Referring to FIG. 1, the chlorine detection apparatus comprises a frame structure 10 on which are mounted the essential components of the apparatus, and which carries a panel 11 on which are monuted meters and control switches as hereinafter described. At the heart of the apparatus is a detection cell 12, which is shown in greater detail in FIG. 2. The cell 12 comprises a container 13 having an inlet 14 for sample air, and an outlet 15, so as to define a flow path for the sample air. The container is a vertically oriented elongated body of cylindrical form, the lower end of which is connected to a tubular drain 16 extending into a reservoir 17 containing sodium chloride solution. A hollow probe 18 mounted in a plug 19, which closes the top of the container 13, extends vertically downwardly within the container. The internal and external surfaces of the probe are interconnected by a ring of fine orifices 20. A silver rod-like electrode 21, forming a cathode extends axially within the probe, and a platinum wire helix 22, forming an anode, is wound on the external surface of the probe 18 below the level of the orifices 20. A plug of cotton 23 or like absorbent material bridges the annular space between the cathode 21 and the orifices 20. In operation of the apparatus, electrolyte is pumped from the reservoir 17 by a pump 24, and is fed into the upper end of the probe 18 via an inlet 25, the electrolyte saturating the cotton plug 23 and so forming an electrolyte bridge as it flows through the orifices 20 and flows as a thin film over the surface of the anode 22. The electrolyte drips from the pointed lower end 26 of the probe and retruns to the reservoir via the drain 16.

The air sample is caused to flow through the container 13 by an air pump 27 connected to the outlet 15. The rate of air flow is measured by a metering device 28, and regulated as required by manually adjustable valves. The metering device 28, which contains a cork float 28a, is housed in a tubular extension of the container mounted on a laterally extending access tube 29. The detection cell assembly, including the container 13 and metering device 28 are made of acrylic platsic in the illustrative embodiment.

If the air sample contains chlorine (or other electronegative gas), the chlorine readily dissolves in the electrolyte film passing over the surface of the anode, with the formation of negative ions. Since the cathode is shielded from the air sample by the wall of the probe. the platinum electrode 22 becomes positively charged with respect to the silver electrode 21, causing a current to flow between the electrodes when they are externally connected. In the present apparatus, these electrodes are connected to the respective terminals of a micro-ammeter 30 mounted on the panel 11, the micro-ammeter circuit thus constituting a current measuring or current detection circuit responsive to the chlorine concentration in the air sample.

The micro-ammeter 30 shown in FIG. 1 has a first pointer 31 and a second pointer 32 which can be adjusted manually to define high and low level settings, respectively, and an instrument pointer 33 whose position is indicative of the actual chlorine concentration in the gas under test.

Figure 2:
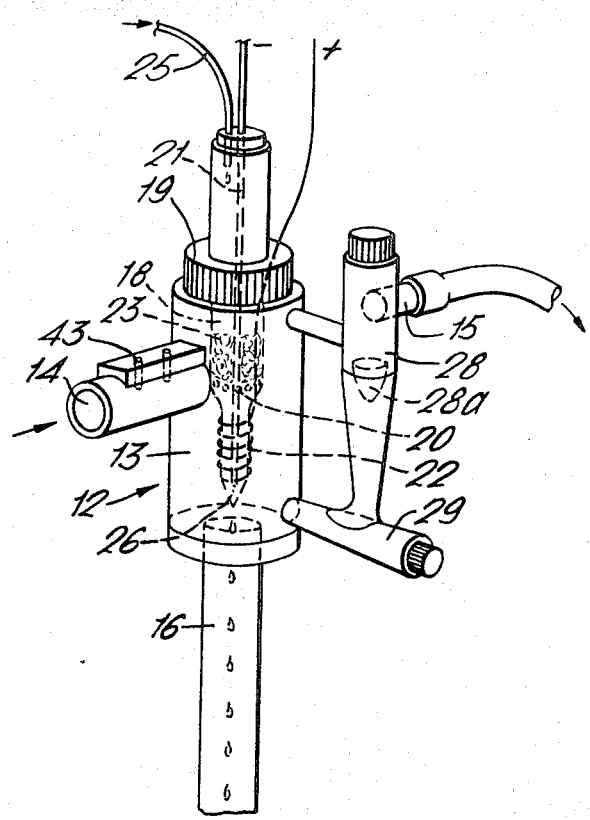
FIG. 2 is a general perspective view of a detection cell used in the apparatus.
Figure 3:
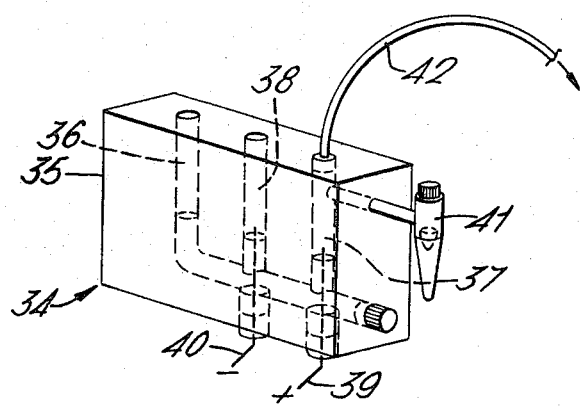
FIG. 3 illustrates a chlorine generating cell used in calibrating the apparatus.

For the purpose of calibrating the micro-ammeter so that it will give a direct reading of the chlorine concentration, a chlorine generating cell 34 is provided. The cell 34 is housed in a chamber 35 and comprise a tubular vessel having a filling column 36, an anode column 37, and a cathode column 38. A pair of platinum electrodes 39, 40 extend into the anode and cathode columns respectively. The electrolyte in the cell 34 is a 1 N solution of hydrogen chloride which, upon electrolysis by a known current, generates chlorine at the anode 39 at a known rate. This chlorine is admixed with air drawn in through an air inlet 41 and passed to the detection cell 12 via a tube 42. As shown in FIG. 2, the air inlet 14 of the detection cell is formed on a tubular extension provided with orifices 43. The tube 42 is connected to the orifices 40 when calibration is performed so that a known rate of flow of chlorine passes through the cell.

Also mounted on the panel 11 shown in FIG. 1 are an elapsed time indicator 44, the purpose of which is to indicate the length of time that the electrolyte has been in service, a milli-ammeter 45 for indicating the electrolysis current passing through the cell 34 during calibration a first indicator light 46 for indicating normal running of the apparatus, a second indicator light 47 for indicating an alarm condition and a third indicator light 48 which indicates that the apparatus is set for calibration. The main switch of the apparatus is shown at 49. Other controls mounted on the panel include a zero adjustment control 50, a reset control 51, a jack 52 for connection to the chlorine generating cell 34, and a jack 53 for connection to the detection cell 12. A main fuse is shown at 54. FIG. 4 is a wiring diagram showing how the above-mentioned components are related to the other components of the apparatus.

Contaminants such as dust and other free floating inpurities brought into the detection cell by the sample air, and which have become mixed with electrolyte, are filtered out by means of a cotton plug filter 55. The electrolyte is thus continually filtered prior to being pumped into the probe. In the illustrative apparatus two sampling tubes 56, 57 are shown; these may be of polyethylene tubing. The sampling tubes are taken to respective locations at which chlorine concentration is to be monitored, the sampled air passing from such locations to the apparatus along the tubes.

When the apparatus is operating normally, a current of between one and two micro-amperes will be flowing steadily and indicated by the meter 30. This small current is due to the oxygen present in the air, oxygen being a slightly soluble electronegative gas. In order to determine if the apparatus is properly responsive to chlorine gas, a test switch 58 (FIG. 4) is actuated; this cause a minute quantity of chlorine gas to be generated in the cell 34 and to be delivered to the cell 12 via the suction tube 42. If a response is observed on the micro-ammeter 30 within a few seconds, then it can be assumed that the apparatus is functioning normally.

The apparatus is calibrated by adjusting the potentiometer 59 (FIG. 4) so that a certain current, say 0.5 milli-amperes, is indicated on the meter 45, and noting the reading on the micro-ammeter 30. The amount of chlorine gas in micrograms per minute delivered is calculated from Faraday's Law of electro-chemical equivalence. Actual tests in the laboratory to determine the efficiency of the electrolysis cell have been made by collecting chlorine and hydrogen gas over water at known current rates and known times. Very close agreement was found between the theoretical values and the actual quantities of chlorine gas produced, indicating that the cell geometry was satisfactory even at this reduced rate. The theoretical amount of chlorine is now delivered via suction tube to the detection cell by means of a small stream of air (50 ml./min.) as measured by flow meter 41. This sall flow of air carrying the chlorine with it, is further diluted with the main sample stream of approximately 700 ml./min. entering the detection cell via the inlet tube thereby providing a combined chlorine air mixture of 750 ml./min. The volume ratio of chlorine to air may now be calculated in terms of parts per million of chlorine by volume in the air sample. The sensitivity of detection of chlorine can now be determined from the sustained measuring circuit current indicated on meter 30, and expressed in micro-amperes per part per million of chlorine in the atmospheric air sample.

I claim:

1. Apparatus for use in providing a measure of an electronegative gas component in a gaseous mixture, comprising:
    (a) a tube formed of an electrically insulating material;
    (b) holes in an upper part only of said tube, adapted for the unimpeded outflow of an aqueous electrolyte from inside the tube;
    (c) a first electrode disposed inside the tube so as to contact liquid electrolyte inside the tube;
    (d) a filter pad of electrically insulating material disposed in said tube between the first electrode and the tube and arranged so that said outflow of aqueous electrolyte passes through the filter pad;
    (e) a second electrode disposed on the outside of said tube at a lower level than said holes, the arrangement being such that said electrolyte flowing from said holes passes over the outside of the tube as a thin film and bridges the space between the first and second electrodes;
    (f) means arranged to supply said aqueous electrolyte in a continuous manner to the inside of said tube;
    (g) current measuring means arranged in circuit with said first and second electrodes and arranged to measure the current flowing between said first and second electrodes through said electrolyte which bridges the space between the first and second electrodes; and
    (h) means for causing the gaseous mixture to flow over the part of the outside of said tube between said holes and said second electrode.

2. Apparatus as claimed in claim 1, and in which:
    (a) a container is provided having an inlet and an outlet;
    (b) means are provided for causing the gaseous mixture to flow through the container from the inlet to the outlet;
    (c) said tube is disposed inside said container with its outer surface in the flow path followed by at least a representative part of the gaseous mixture.

3. Apparatus according to claim 2, including means for measuring the rate of flow of gaseous mixture through the container.

4. Apparatus according to claim 3, for detecting the presence of chlorine in air, wherein the first and second electrodes are of silver and platinum, respectively.

5. Apparatus according to claim 4, wherein the electrolyte is an aqueous solution of a chloride salt.

6. Apparatus according to claim 3, for measuring the content of chlorine in air, including an electrolytic cell for generating chlorine gas at a measured rate, and valve means for selectively connecting the cell to the inlet of the container whereby the chlorine gas is caused to flow through the container, thereby providing a standard sample by which the apparatus may be calibrated.

7. Apparatus according to claim 3, including alarm means responsive to said current detection means for producing an alarm signal in accordance with the concentration of the electronegative gas component exceeding a predetermined amount.

8. Apparatus as claimed in claim 1, and in which the tube is arranged with its axis vertical so that said electrolyte flows continuously over part of the outside of the tube below said holes and drips off the bottom end of the tube.

9. Apparatus as claimed in claim 1, and in which the second electrode is in the form of a wire spiral wound on and extending round the outside of said tube.

10. Apparatus according to claim 1, including means for recirculating the electrolyte through the apparatus, the recirculating means including a reservoir, a drain connection from the container to the reservoir, and a pump for recirculating electrolyte from the reservoir to the interior of the tube.

References Cited

UNITED STATES PATENTS

| | | | |
|---|---|---|---|
| 3,694,338 | 9/1972 | Weingarten | 204—195 R |
| 2,651,612 | 9/1953 | Haller | 204—195 R |
| 2,744,061 | 5/1956 | Ford et al. | 204—1 T |
| 2,862,859 | 12/1958 | Grosskopf | 204—1 T |
| 3,471,391 | 10/1969 | Peters et al. | 204—195 R |
| 2,805,191 | 9/1957 | Hersch | 204—1 T |
| 2,396,934 | 3/1946 | Wallace | 204—195 R X |
| 2,585,811 | 2/1952 | Marks | 204—1 T |
| 3,038,838 | 6/1962 | Brewer et al. | 204—195 R |
| 3,546,079 | 12/1970 | Waclawik et al. | 204—1 T |

GERALD L. KAPLAN, Primary Examiner

UNITED STATES PATENT OFFICE
CERTIFICATE OF CORRECTION

Patent No. __3,761,377__    Dated __September 25, 1973__

Inventor(s) __O. K. C. MANG__

It is certified that error appears in the above-identified patent and that said Letters Patent are hereby corrected as shown below:

Column 3, line 68, change "sall" to -- small --.

Signed and sealed this 16th day of April 1974.

(SEAL)
Attest:

EDWARD M.FLETCHER,JR.      C. MARSHALL DANN
Attesting Officer          Commissioner of Patents